Dec. 2, 1952     W. F. HUNICKE ET AL     2,619,756

FISHING LURE, INCLUDING FISH ACTUATED IMPALING MEANS

Filed May 22, 1950

William F. Hunicke
Walter Haseman
INVENTORS

Patented Dec. 2, 1952

2,619,756

UNITED STATES PATENT OFFICE 2,619,756

FISHING LURE, INCLUDING FISH ACTUATED IMPALING MEANS

William F. Hunicke and Walter Haseman, Evansville, Ind., assignors of fifty-one per cent to Charles R. Jones, Evansville, Ind.

Application May 22, 1950, Serial No. 163,356

5 Claims. (Cl. 43—35)

This invention relates to new and useful improvements in fishing devices and the primary object of the present invention is to provide a lure body including at least one swinging hook normally concealed in the body and which is urged from the body to effectively impale a fish as the fish strikes and makes a run with the lure.

Another very important object of the present invention is to provide a fishing lure including a swinging hook member that is concealed within the lure body and embodying novel and improved means for urging the hook member from the body when a fish strikes the body or when actuated by a fishing line attached to the means.

A further object of the present invention is to provide a fishing lure including an upper and lower pair of concealed hook members that are simultaneously actuated to a position exteriorly of the lure body to effectively impale a fish, regardless of the portion of the lure the fish grabs.

A still further aim of the present invention is to provide a fishing lure of the aforementioned character that is simple and practical in construction, strong and reliable in use, small and compact in structure, neat and attractive in appearance, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
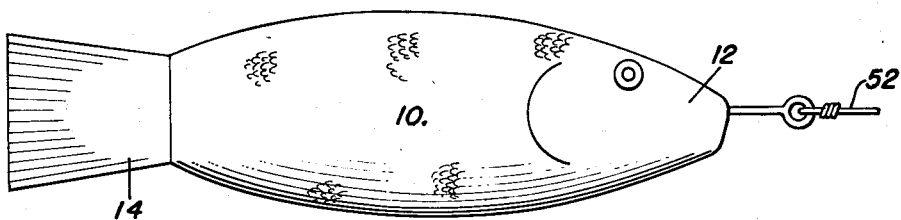
Figure 1 is a side elevational view of the fishing lure.

Referring now to the drawings in detail, wherein for the purpose of illustration, there is disclosed a preferred embodiment of the present invention, the numeral 10 represents an elongated body or body member having a forward end 12 and a rear end 14. The body member 10 is suitably colored or painted to attract fish thereto and is also suitably shaped to further aid in attracting fish thereto, the shape and coloring as well as the size of the body member varying in accordance with the type or species of fish that are to be attracted to the device.

The body member 10 is provided with an elongated opening 16 intermediate its ends and a longitudinal bore 18 at its forward end that intersects the opening 16. The rear end 14 of the body member 10 is formed with a recess 20 that intersects the opening 16 and which registers with the bore 18.

Upper and lower transverse pivots 22 and 24 extend through the forward portion of the opening 16 and preferably through the sides of the body member. The pivots 22 and 24 swingably support the eye terminals 26 of upper and lower rearwardly extending hooks or hook members 28 and 30 that are swingable into or out of the opening 16.

Upper and lower coil springs 32 and 34 embrace the pivots 22 and 24. The springs 32, 34 include rear ends terminating in hooks or loops 36 and 38 that surround the shank portions of the hook members and forward ends that terminate in pointed lugs 40 and 42 that penetrate the forward wall of the opening 16 or the forward end of the body member. The springs 32 and 34 yieldingly urge the hook members into the opening 16 and thereby normally conceal the hook members from a fish approaching the body member.

A rod 44 is slidably received in the bore 18 or stated differently, the body member is slidably received on the rod 44 that enters the bore 18. The rear end of the rod 44 supports a combined cam and guide channel 46 whose ends project laterally from opposite sides of the rod to receive the upper and lower hook members 28, 30 and more particularly the curved portions 28a and 30a of the hook members.

A coil spring 48 is positioned in the recess 20 and its rear end is anchored to the walls of the recess by a fastener 50 or the like. The forward end of the spring 48 is attached to channel 46 or the rear end of the rod 44 to urge the rod rearwardly of the body member so that the springs 32, 34 may accomplish their function of retaining the hook members in the opening 16.

A fishing line 52 is attached to the forward eye end of the rod 52 whereby the body member and its associated parts may be pulled through a fluid medium even though a fish may be impaled by one of the hook members.

In practical use of the present invention, as a fish strikes at and runs with the body member 10, the body member will be pulled by the fish rearwardly on the rod 44 whereby the curved portions 28a and 30a will ride against the channels 46 to urge the hook members from the opening 16 to impale the fish. Obviously, a pull on the line 52 will reduce the length of time required to expose the hook members from the opening 16. Furthermore, a quick pull on the line 52 will force the channel 46 against the portions 28a, 30a and expose the hook members at will.

Figure 4:
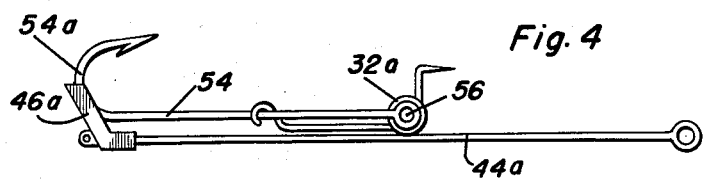
Figure 4 is an elevational view of the hook operator in slightly modified form; and, Figure 5 is an elevational view of the lure in modified form.

Figure 4 shows the hook actuator in slightly modified form for use when but a single hook 54 is to be used with the body member. In this embodiment, the rod 44a supports at its rear end an inclined guide and cam 46a that receives the curved portion 54a of the hook 54. The pivot 56 for the hook 54 supports a coil spring 32a similar to the springs 32 and 34 and which functions as the springs 32 and 34 in urging the hook into the opening in the body member.

Figure 2:
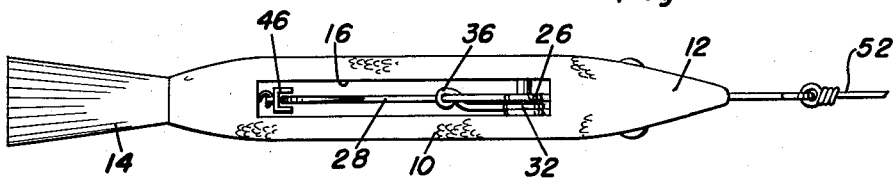
Figure 2 is a plan view of Figure 1.
Figure 3:
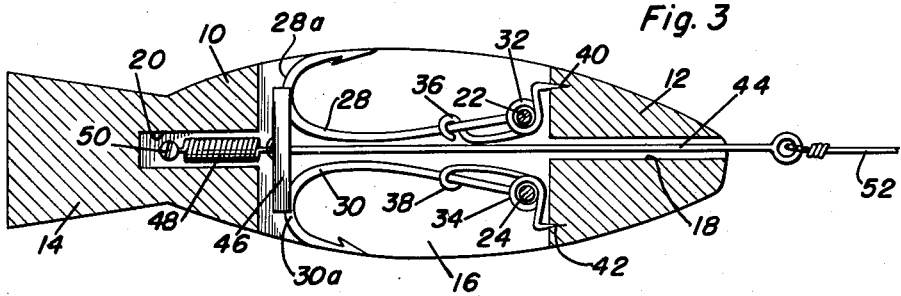
Figure 3 is a longitudinal vertical sectional view taken substantially through the center of Fig. 1.

The operation of the actuator shown in Figure 4 is identical to the actuator shown in Figures 1–3 inclusive.

Figure 5:
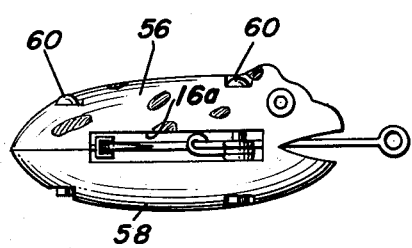

Attention is next directed to Figure 5 wherein there is disclosed the lure in slightly modified form. In this embodiment, the lure is preferably composed of upper and lower body sections 56 and 58 that are joined by fasteners 60. The hook structure and actuating means for the hook structure assumes the form shown in Figures 1–3 inclusive or Figure 4 but the opening 16a for the hook or hooks is located in the side or sides of the lure body.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing lure comprising an elongated body member having a central portion and forward and rear end portions, said central portion having an opening therein and said forward end portion having a bore intersecting said opening, a hook member having a forward end pivoted in said opening for movement into and out of said opening, means within the opening and engaged with and acting on said hook member for urging the hook member into the opening, a rod underlying said hook member and having an intermediate portion slidably received in said bore, a spring in the opening and engaging and retracting the rod, and a straight guide channel carried by and disposed perpendicular to said rod and receiving the rear portion of said hook member between its flanges, said hook member including a curved barbed portion riding against said channel and being urged from said opening upon rearward sliding movement of the body member on the rod or forward sliding movement of the rod in said bore.

2. A fishing lure comprising an elongated body member having a central portion and forward and rear end portions, said central portion having an opening therein and said forward end portion having a bore intersecting said opening, a hook member having a forward end pivoted in said opening for movement into and out of said opening, means within the opening and acting on said hook member for urging the hook member into the opening, a rod having a rear portion slidably received in said bore, and a straight guide channel carried by and projecting laterally from the rear portion of said rod and disposed perpendicular to said rod, said channel receiving the rear end portion of said hook member, said hook member riding against said channel and being urged from said opening upon rearward sliding movement of the body member on the rod or forward sliding movement of the rod in said bore, a pivot extending through the opening and swingably supporting said hook member, said first named means including a coil spring embracing said pivot and having first and second end portions, a hook at the first end portion of said spring embracing said hook member, and a laterally projecting pointed anchor lug at the second end portion of said spring entering the wall of said opening.

3. A fishing lure comprising an elongated body member having a central portion and forward and rear end portions, said central portion having an opening therein and said forward end portion having a bore intersecting said opening, a hook member having a shank pivoted in said opening adjacent said forward portion for movement into and out of said opening, said hook member extending rearwardly from its pivot and including a curved rear portion, means within the opening and acting on said hook member for urging the hook member into the opening, a rod having a rear portion slidably received in said bore, and a straight guide channel secured to the rear portion of said rod and disposed perpendicular to the rod, said channel receiving the rear portion of said hook member between its side flanges, said hook member riding against said channel and being urged from said opening upon rearward sliding movement of the body member on the rod or forward sliding movement of the rod in said bore, said rear end portion of said body member having a recess in registry with said bore and intersecting said opening, and a coil spring received in said recess and terminally attached to the wall of said recess and the rear end portion of said rod for urging the channel from the hook member.

4. A fishing lure comprising an elongated body having forward and rear end portions and a vertical opening intermediate its end portions, said body having a longitudinal bore in its forward end portion intersecting said opening, a rod slidably received in said bore and having a forward end exposed from the body for attachment to a line, upper and lower pivots within the opening and supported on the wall of the opening, said pivots being disposed transversely of the rod, upper and lower hook members swingably mounted on said upper and lower pivots respectively, and always remaining one above the other, said hook members being movable into and out of the opening, and a combined cam and guide channel centrally fixed to the rear end of said rod and disposed perpendicular to the rod for engaging both hooks to simultaneously urge both hooks from the opening upon movement of the body rearwardly on the rod or movement of the rod forwardly of the body.

5. The combination of claim 4 and a spring on each pivot yieldingly urging the hook member thereon into said opening.

WILLIAM F. HUNICKE.
WALTER HASEMAN.

REFERENCES CITED

The following references are of record in the file of this patent:

UNITED STATES PATENTS

| Number | Name | Date |
|---|---|---|
| 720,322 | Burkholder | Feb. 10, 1903 |
| 869,469 | Wilson | Oct. 29, 1907 |
| 1,430,642 | Gross | Oct. 3, 1922 |
| 1,609,151 | Bruenig | Nov. 30, 1926 |
| 1,670,174 | Wiersma | May 15, 1928 |
| 1,994,878 | Smith et al. | Mar. 19, 1935 |
| 2,044,702 | Kalyu | June 16, 1936 |
| 2,079,509 | Kettring | May 4, 1937 |
| 2,190,089 | Sund | Feb. 13, 1940 |
| 2,256,088 | Hogan | Sept. 16, 1941 |